UNITED STATES PATENT OFFICE 2,353,166

TREATMENT OF WELL DRILLING FLUIDS

Henry C. Lanz, Jr., and Delmar H. Larsen, Los Angeles, Calif., assignors to National Lead Company, Los Angeles, Calif., a corporation of New Jersey No Drawing. Application May 25, 1942, Serial No. 444,428

10 Claims. (Cl. 252—8.5)

This invention relates to the treatment of well drilling fluids and more particularly to the control and regulation of the viscosity thereof.

Well drilling fluids, particularly as used in the drilling of oil and gas wells, are generally aqueous in that the dispersion medium contains water. A drilling fluid may be composed of clay and water, although, in many instances, an emulsoid colloid, such as bentonite, or a weighting material, such as barytes, is added. The viscosity of a drilling fluid must be rather closely controlled in order to enable the fluid to not only bring the cuttings to the surface, but also to permit the cuttings to be deposited and to prevent gas cuttings.

Well drilling fluids are subject to unusual conditions from time and temperature standpoints, and these effect the condition thereof and particularly its viscosity. While it has been the practice to add to a drilling fluid various viscosity reducing agents, and while these agents reduce the viscosity, there is frequently a reversion to a higher viscosity as time goes on and particularly when higher temperatures are encountered. In actual drilling of deep wells the temperature at the bottom may exceed the boiling point of water, while the time of travel of an increment of a drilling fluid, in its circuit, during rotary drilling may exceed an hour.

One of the objects of this invention, therefore, is to provide a viscosity-reducing agent which is not only efficient, but in which there will be a minimum of reversion.

Another object is to provide a novel well drilling fluid containing such an agent.

Another object is to provide a process of treating a well drilling fluid with such an agent.

Further objects will appear from the detailed description in which will be set forth a number of embodiments of this invention; it will be understood, however, that this invention is susceptible of various other embodiments, within the scope of the appended claims.

In accordance with an illustrative embodiment of this invention, the agent employed is a water-dispersible phytic acid compound, and more particularly one which is water soluble. This agent may be phytic acid itself or a salt of phytic acid, such as sodium phytate. This agent may be employed by the addition of a small percentage thereof to the drilling fluid. It may, however, be added to the water used in making the drilling fluid. It may also be added as a small percentage to an emulsoid colloid, such as bentonite or other emulsoid colloids such as described in the Harth Patent 1,991,637, or to a weighting material such as barytes, iron oxide or celestite. It may also be incorporated with both an emulsoid colloid or a weighting material. In all such cases the well drilling fluid material, comprising the fluid base and the agent, may be prepared material capable of addition to a well drilling fluid.

Phytic acid, also known as inosito hexaphosphoric acid, and its various salts, were described by S. Posternak in 1921 (Helv. Chim. Acta, 4, 150, 1921). This is a discussion of R. J. Anderson's work on the preparation of various salts of phytic acid in order to establish its structural formula. Anderson claims it to be $C_6H_{18}O_{24}P_6$. Posternak thinks it should be $C_6H_{24}O_{27}P_6$, but concedes this much—that it could be written $C_6H_{18}O_{24}P_6 \cdot 3H_2O$, stressing the fact that those 3 moles of $H_2O$ could not be removed without destroying the compound. Writing Posternak's formula as $H_{24}C_6O_{27}P_6$, the sodium salt can generally be written $Na_xH_{24-x}C_6O_{27}P_6$, so that sodium phytate will be $Na_{12}H_{12}C_6O_{27}P_6$ if Posternak's formula is accepted or $Na_{12}H_6C_6O_{24}P_6$ if Anderson's formula is considered correct. There will, of course, be various compounds from the acid to sodium phytate with intermediate sodium acid phytates. The sodium may, of course, be replaced in the above formulas by potassium or other alkali metals, so as to produce a water soluble compound. The calcium, barium, silver, iron and copper salts of phytic acid are all insoluble in water.

A satisfactory viscosity reducing agent is sodium phytate, although phytic acid itself may be used, as well as the intermediate sodium acid phytates. Calcium phytate, while capable of employment, is not nearly as efficient as an alkali metal phytate.

The following illustrations show the action of sodium phytate on various drilling muds. 100 milliliters of a bentonite-water mud containing 2% bentonite, having an initial viscosity of 36.2 centipoises (Stormer), when treated with 40 milligrams of sodium phytate had its viscosity reduced to 17.8 centipoises. 100 milligrams of a representative clay drilling mud (Newhall), having an initial viscosity of 30.2 centipoises, when treated with 70 milligrams of sodium phytate, had its viscosity reduced to 16.7 centipoises. The viscosity tests on the above were made immediately after the addition of the sodium phytate, and on a mole basis sodium phytate was as effective as tetrasodium pyrophosphate on the bentonite mud, but was twice as effective on the Newhall mud. Continuing the comparison after twenty four hours standing, the sodium phytate-treated mud reverted less than did the pyrophosphate-treated mud. When the mud was heated for twenty four hours at 150°, the reversion of the sodium phytate-treated mud was lower than the reversion of the pyrophosphate treated mud. When the muds were disintegrated or agitated at 160° F. the reversion of the sodium phytate-treated mud was considerably less than that of the pyrophosphate-treated mud. When the treated muds were thinned with water and more agent added, the reversion of the phytate-treated mud was less than that of the pyrophosphate-treated mud.

The above test is, of course, a laboratory test, made in order to show the efficiencies of the treating agent in the treatment of drilling fluids. In the actual treatment of drilling fluid, the proceduce is not one of using a given proportion or percentage of the treating agent with reference to the drilling fluid; the treatment is one of adjusting the viscosity of the drilling fluid by the addition of the treating agent. This will be apparent when we consider the fact that during the course of drilling a formation which may contain salts, cement, or cuttings, generally the viscosity will be affected by the addition of these formation ingredients. The water used in the making of the drilling fluid, the temperature at the bottom of the well (which, as previously stated, may be above the boiling point of water), and other conditions also affect the viscosity of the drilling fluid. The practical procedure, therefore, is to add the treating agent in accordance with the requirements in order to secure the desired viscosity and, in general, the desired reduction of the viscosity of a drilling fluid which has become contaminated by the ingredients of the formation.

It will thus be seen that the invention accomplishes its objects. Compared with the best agent, namely, a polyphosphate, the efficiency on a mole basis of a phytate is not only higher than that of the pyrophosphate, but the reversion is less under the conditions of time, heating, agitation and thinning, all of which are encountered in the practical operation in the drilling of a deep well.

Having thus described the invention, what is claimed is:

1. An aqueous well drilling fluid containing a small percentage of a water-dispersible phytic acid compound.

2. An aqueous well drilling fluid containing a small percentage of a water-dispersible salt of phytic acid.

3. An aqueous well drilling fluid containing a small percentage of water-dispersible sodium phytate.

4. The process of treating aqueous well drilling fluids, comprising, adding thereto a small percentage of a water-dispersible phytic acid compound.

5. The process of treating aqueous well drilling fluids, comprising, adding thereto a small percentage of a water-dispersible salt of phytic acid.

6. The process of treating aqueous well drilling fluids, comprising, adding thereto a small percentage water-dispersible sodium phytate.

7. A prepared well drilling fluid material comprising a water-dispersible solid drilling fluid base and a water-dispersible phytic acid compound, said material being in a substantially dry state.

8. A prepared well drilling fluid material comprising a water-dispersible emulsoid colloid and a water-dispersible phytic acid compound, said material being in a substantially dry state.

9. A prepared well drilling fluid material comprising a water-dispersible weighting material and a water-dispersible phytic acid compound, said material being in a substantially dry state.

10. A prepared well drilling fluid material comprising a water-dispersible weighting material, a water-dispersible emulsoid colloid and a water-dispersible phytic acid compound, said material being in a substantially dry state.

HENRY C. LANZ, Jr.
DELMAR H. LARSEN.